J. BEECHER.
POT.
APPLICATION FILED FEB. 21, 1912.
1,054,083.
Patented Feb. 25, 1913.
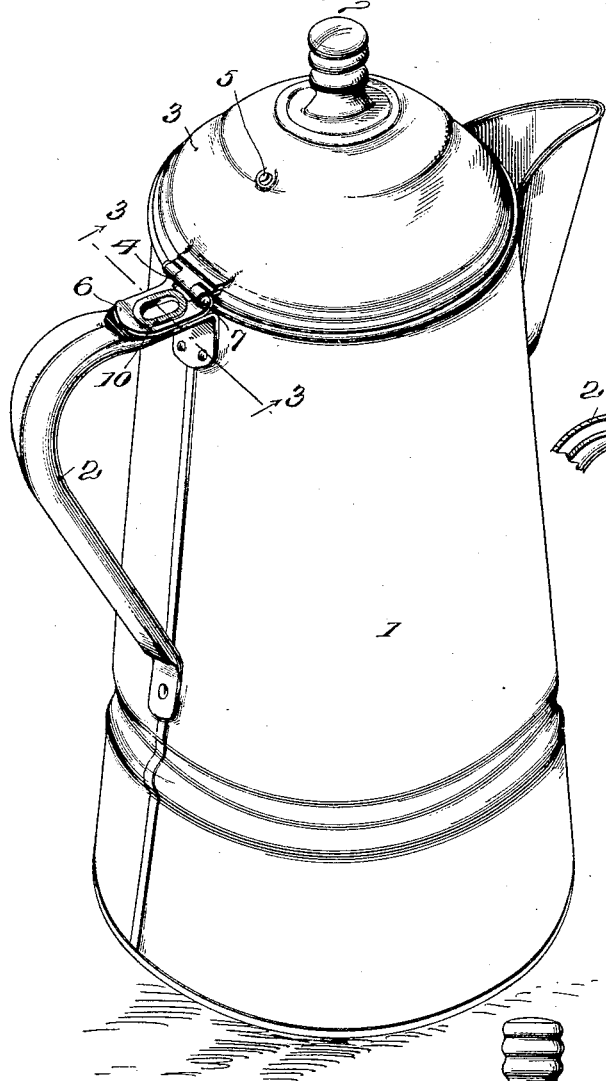
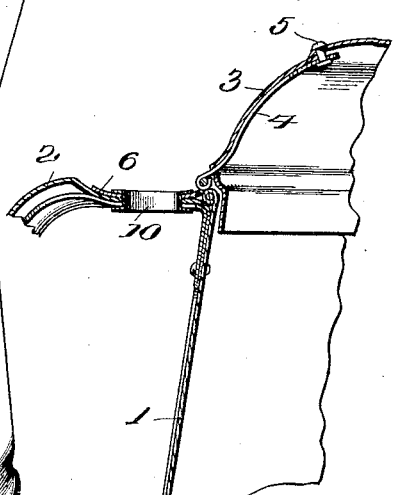
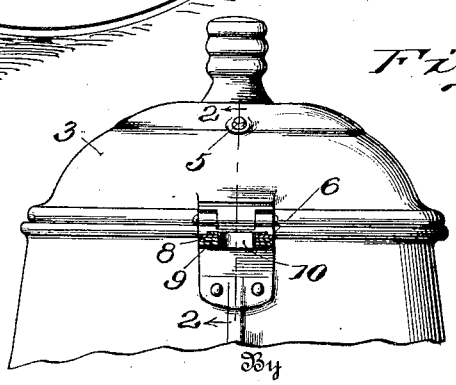
Witnesses
W. A. Williams.
R. S. Gaskill.
Inventor
John Beecher
By Robertson & Johnson
Attorneys

UNITED STATES PATENT OFFICE.

JOHN BEECHER, OF NEWARK, NEW JERSEY, ASSIGNOR TO THE CENTRAL STAMPING CO., OF NEW YORK, N. Y., A CORPORATION OF NEW YORK.

POT.

1,054,083. Specification of Letters Patent. Patented Feb. 25, 1913.

Application filed February 21, 1912. Serial No. 679,073.

*To all whom it may concern:*

Be it known that I, JOHN BEECHER, a citizen of the United States of America, and resident of Newark, in the county of Essex and State of New Jersey, have invented certain new and useful Improvements in Pots, of which the following is a specification.

My invention relates to pots having a handle on the side and provided with a hinged lid such as are commonly used as coffee and tea pots. In pots of this kind, there has been difficulty in securing the hinged lid firmly to the rest of the pot and various connections have been suggested. In some instances one leaf of the hinge has been riveted or otherwise secured to the lid, the lid with the hinge thus forming a separate structure which is then secured to the pot. Sometimes this structure has been secured to the handle but not in the advantageous manner which I have devised. Obviously it is important that the lid and hinge shall be firmly secured to the handle so as to prevent any relative movement between the leaf of the hinge which is secured to the handle and the handle itself. Such pots are customarily made of metal and as this material is a good conductor the provision of some insulation or means for preventing conduction of heat from the pot to the handle is necessary. These objects I have attained in a very simple manner by riveting one leaf of the hinge to the handle by means of an eyelet inclosing a considerable insulating space.

In the accompanying drawings: Figure 1 is a perspective view of a pot embodying the invention. Fig. 2 is a vertical section showing the parts and the mode in which they are connected, this view being taken on the line 2—2, Fig. 3. Fig. 3 is an incomplete elevation, the securing means being shown in section on the line 3—3, Fig. 1.

Referring to the drawings by numerals: The pot 1 is provided with the handle 2 and the lid 3 which is firmly secured to the hinge leaf 4 which passes through the lid as shown and is fastened thereto by the rivet 5 or by other suitable means. My invention does not lie in the precise mode of connecting the hinge and lid and this may be varied as may be desired. The other leaf 6 of the hinge is secured to the leaf 4 by the customary pintle 7. This leaf 6 is preferably flat to correspond with a portion of the top of the handle 2 which is flattened. This is best arranged adjacent the rim of the pot 1. The handle is best made of a tubular construction so that when it is crushed together a multiple thickness is presented as shown by the layers 8 and 9 in the section in Fig. 3. Both the leaf 6 of the hinge and the flattened part of the handle are provided with large registering holes through which passes an eyelet 10 which, like the holes, I prefer to make elongated in the plane of the handle. This eyelet is riveted on the under side of the handle to secure the leaf 6 permanently and immovably upon the flat portion of the handle. The shape of the eyelet is such as to prevent the leaf 6 from turning on the handle and need not necessarily be oval but might be oblong, the shape being such as to inclose a large space as well as to prevent undesirable movement. As the eyelet passes completely through the handle it can be certainly and securely riveted so that the connection is thoroughly reliable and as the eyelet takes the place of a considerable amount of conducting material and destroys the continuity of the conducting material, except at the edges of the handle, and very materially reduces the amount of metal through which the heat can pass to go to the handle, it obviously has the function of a heat insulator for the handle. I have found this construction advantageous where the body of the pot and its handle are made of enameled-ware and the lid and hinge of tin but of course its applicability is not limited to pots made of these differing materials. I have also found it desirable to use brass as a material for the eyelets since this is softer than some other metals and is easily worked but other metals might be employed.

Instead of using a single large eyelet, I may employ two or more small eyelets and thus secure some of the advantages above referred to, but I greatly prefer to use a single enlarged eyelet which is effective in insulating the handle by introducing a large insulating space as well as in the other ways mentioned.

What I claim as my invention is:

1. A pot having on the side a handle, and provided with a lid, a hinge having two leaves one of which is secured to the lid, and an eyelet enlarged with reference to the handle passing through the other leaf and completely through said handle and thus inclosing a considerable heat insulating air space and securing said second leaf and handle firmly together, said eyelet being of such shape as to prevent turning of said second leaf on the handle.

2. A pot having on the side a handle having a flattened portion adjacent the rim of the pot, said pot being provided also with a hinge having two leaves one of which is secured to said lid and the other of which is flat and superposed upon the flattened portion of the handle, and an elongated eyelet passing through said flat leaf and said flattened portion of the handle and riveting the same together, said eyelet inclosing a large hole through said leaf and handle.

3. A pot having on the side a tubular handle having a part of its top crushed together to form a flattened portion of multiple thickness elongated in the plane of the handle, said pot being provided also with a hinge having two leaves one of which is secured to said lid and the other of which is flat and is superposed upon the flattened portion of the handle, both said flat leaf and said flattened portion of the handle having large registering holes elongated in the plane of the handle and extending through the superposed leaf and handle, and an eyelet also elongated in the plane of the handle corresponding to said registering holes passing through the same and riveted to hold said flattened portion and leaf in intimate contact and secure them against relative movement.

In testimony whereof I affix my signature in presence of two witnesses.

JOHN BEECHER.

Witnesses:
PIERCE L. BUTLER,
W. M. AIKMAN, Jr.